Fig. 1

Dec. 10, 1957     J. MAHLER     2,816,047
METHOD OF MAKING AN OPTICAL FILTER AND RESULTANT ARTICLE
Filed March 8, 1954     7 Sheets-Sheet 2

Fig. 2

INVENTOR
JOSEPH MAHLER
BY
ATTORNEY

INVENTOR
JOSEPH MAHLER
BY
ATTORNEY

INVENTOR
JOSEPH MAHLER
BY
ATTORNEY

United States Patent Office 2,816,047
Patented Dec. 10, 1957

2,816,047
METHOD OF MAKING AN OPTICAL FILTER AND RESULTANT ARTICLE

Joseph Mahler, Westport, Conn., assignor to American Optical Company, Southbridge, Mass., a voluntary association of Massachusetts Application March 8, 1954, Serial No. 414,619

34 Claims. (Cl. 117—33.3)

This invention relates to improvements in light absorptive means and has particular reference to synthetic plastic materials having the properties of selective absorption as to certain of the rays of the visible spectrum and controlled absorption as to the invisible portions of the spectrum, novel chemical compounds, and method of treating said materials with said compounds so that the materials may be made to possess said properties.

This application is a continuation-in-part of my previous application filed June 29, 1950, and bearing Serial No. 171,188 which, in turn, was a continuation-in-part of my earlier application filed September 28, 1949, and bearing Serial No. 118,467, both applications having been abandoned.

One of the principal objects of the invention is to provide normally transparent materials of the synthetic plastic classes with effective and stable absorptive characteristics as to certain of the rays of the visible spectrum, controlled absorptive characteristics as to the invisible portions of the spectrum, and novel compounds and methods of treatment of such materials with said compounds so as to introduce said absorptive characteristics.

Another object is to provide a novel method of treating synthetic plastic materials so that said materials will have stabilized selective absorption of certain of the rays of the visible spectrum and controlled absorption as to rays of the near infra-red and ultra-violet regions of the spectrum, with said infra-red absorption being greater than the visible absorption.

Another object is to provide synthetic plastics having a maximum peak of transmission in the visible region and with near cutoff in the infra-red and ultra-violet regions of the spectrum.

Another object is to provide synthetic plastic materials with stable light absorptive properties of the above character rendering them suitable for use as television filters, eye protective and other types of lenses and the like wherein said materials are more desirable than materials of a vitreous nature.

Another object is to provide a novel method of treating materails of the character described whereby various types of glasses used for welding or for lenses of sun glasses or the like can be closely duplicated as to color and general absorptive properties.

Another object is to provide a novel method of treating synthetic plastic materials by first causing said materials to absorb a predetermined amount of ingredients in a first solution which may be subsequently chemically reacted with ingredients of an additional solution or solutions whereby the resultant material will possess desired color, density of color, and absorption as to the visible, ultra-violet and infra-red rays.

Other objects and advantages of the invention will become apparent from the detailed description which follows taken in connection wtih the accompanying drawings in which:

Figs. 1, 2 and 3 are transmission curves of various light-transmitting media of the alcohol soluble type made in accordance with this invention;

Many attempts have been made in the past to develop a synthetic plastic material having infra-red and ultra-violet absorptive characteristics as well as having controlled transmission of certain of the rays of the visible spectrum, the best conditions existing when the visible transmission is greater than the near infra-red transmission. None, however, has been entirely successful in providing such a material with the desired absorption characteristics.

In such instances when it might be desirable to substitute synthetic plastics in the manufacture of products presently made of materials of a vitreous nature it has been either difficult or impossible to duplicate many of the important characteristics of the products. As an example, it is desirable to provide a transparent synthetic plastic simulating the color and infra-red absorptive characteristics of various types of glasses used in the welding industry and the like wherein infra-red absorption is of prime importance. Another example is the desirability of substituting a transparent plastic material for the glasses used for the lenses of sun glasses or other similar filters wherein it is essential to have a lens having excellent ultra-violet and infra-red aborptive properties. Still another desirable use for a plastic of the above character is as a filter for positioning between a television screen and an observer for increasing contrast discrimination in the image as viewed and maintaining at substantially normal level the threshold of vision of the observer.

To produce such a plastic, it is proposed to form in situ within the body of the plastic material iron or copper organic compounds which will provide an otherwise transparent and normally non-absorbing plastic with the desired low transmission (or high absorption) in the ultra-violet and infra-red regions of the spectrum while obtaining relatively high transmissions at selected wave lengths in the visible region of the spectrum.

The process is carried out, in one form of the invention, by initially preparing two solutions, one of which contains a controlled amount of an amino hydroquinone di-alkyl ether dissolved in a suitable solvent in which the plastic being treated is soluble, which solution we shall designate as Solution A. Preferably, this solution also contains a small amount of a strong oxyacid such as sulphuric or nitric acid. The second solution which shall be designated as Solution B contains a controlled amount of a soluble copper or iron salt also dissolved in a suitable solvent in which the plastic being treated is soluble.

This material is immersed in one solution for a predetermined time interval in accordance with the resultant density desired. At this time the surface of the film or sheet is wiped dry of excess solution. If desired, the film or sheet may be allowed to completely dry at room temperature which process will normally take three hours or more. Subsequently, the film is immersed in the other solution to cause the desired reaction of the metal salt and amino hydroquinone di-alkyl ether to take place in situ in the plastic and to produce the desired results with respect to resultant density of color and infra-red and ultra-violet absorptive characteristics, the time intervals being dependent upon the concentration of the solutions and the thickness of the material being treated.

The density will depend not only on the concentration of the solutions but also on the extent of penetration of the film or sheet by the solutions during the cycle of immersion, which in turn is determined by the length of time the film or sheet is immersed. If the time cycle and concentration of the solutions were such that only partial penetration took place the density would then be determined by the depth of penetration in accordance with the concentration of the solutions.

Therefore, it will be understood that a thin film or sheet can be made to have substantially the same density as a somewhat thicker film or sheet when using the same concentration of solutions by controlling the initial thickness of the film or sheet so that when complete saturation and consequent swelling takes place the film or sheet will be of substantially the same thickness as the thicker film or sheet which will be only partially saturated.

The process is useful with many different plastics, care being exercised to use the proper solvent for the plastic as the carrier vehicle for the metal salt and amino hydroquinone di-alkyl ether to assure the desired uniform penetration of the reacting ingredients. For example, if it is desired to treat plastic materials such as cellulose acetate, cellulose butyrate, cellulose nitrate, ethyl cellulose, cellulose propionate, polyvinyl chloride, vinyl chloride, acetate and the like, any of the lower alkyl alcohols such as methyl, ethyl, propyl, butyl or amyl alcohol would be preferred. However, if the materials being treated were water soluble such as gelatin, polyvinyl alcohol, or carboxyl methyl cellulose, water would be the preferred solvent. Mixtures of water and alcohol might also be used, and to which partially dissolving active solvents such as the aldehydes or ketones, for example acetone, might be added, if desired. The important thing is that the solvent be capable of penetrating the plastics being treated to deposit the metal salt or the di-alkyl ether, as the case may be, within the interior of the plastic being treated.

The plastics being treated may be in any of a variety of forms such as thin sheets or foils which are sandwiched between layers of protecting glass and are used in sun glasses or wide vision range shields of welding helmets. They may be cast objects such as lenses or the like. They might also be relatively thick sheets such as are useful as filters for television.

Although an extremely broad range of proportions for the solutions may be utilized in accordance with the density or transmission characteristic desired, it has been found that a preferred range of proportions would be as follows:

In Solution A, using 100 cc. of alcohol or water, the amino hydroquinone di-alkyl ether may comprise from .2 to 5 grams, and the oxyacid, if used, from .25 to 1.0 cc. In Solution B, using a 100 cc. of solvent, as the carrier vehicle, from 0.1 to 25 grams of the metal salt may be added.

The amino hydroquinone di-alkyl ether is preferably either amino hydroquinone di-ethyl ether (2,5-diethoxy aniline) or amino hydroquinone di-methyl ether (2,5-dimethoxy aniline). Although cupric or ferric chloride are the preferred metal salts, other copper or iron chlorides such as copper ammonium chloride, cupric potassium chloride and the like have been satisfactorily substituted in substantially the same quantities and produced satisfactory results. It is understood that the reaction of the iron or copper chloride with the di-alkyl ether produces a copper or iron organic compound within the plastic in which the iron or copper has been converted at least in part to ferrous or cuprous form whereby the plastic obtains a marked increase in absorptive characteristics in the ultra-violet and infra-red regions of the spectrum. Thus, any of the iron or copper salts possessing this characteristic in the presence of amino hydroquinone di-alkyl ether with or without heat would come within the scope of applicant's invention. It is also to be understood that the copper or iron salts will be soluble in, or otherwise compatible with, the particular solvent being used as the base or carrier vehicle.

The following has been found useful when treating alcohol soluble plastics such as cellulose acetate and those mentioned above:

Table A

Solution A:
  1000 cc. alcohol
  6.25 grams amino hydroquinone di-ethyl ether
Solution B:
  1000 cc. alcohol
  25 grams cupric chloride A cellulose acetate film for instance, of a thickness of approximately 0.040″ immersed for approximately 3 minutes in Solution A having the proportions as indicated in the above Table A shows no visible characteristics differing appreciably from the initial film but is now in a swelled condition. Then, after wiping the surface to remove any excessive ether therefrom, the film is allowed to thoroughly dry during which time oxidation will take place. The film is subsequently immersed in the Solution B. The film is immersed for such a time in Solution B as to complete the reaction between the ingredients in the solutions, with the extent of such reaction being determined by the extent of saturation of the film with the first solution, which in this instance will be that resulting from 3 minutes' immersion in Solution A.

Figure 1:
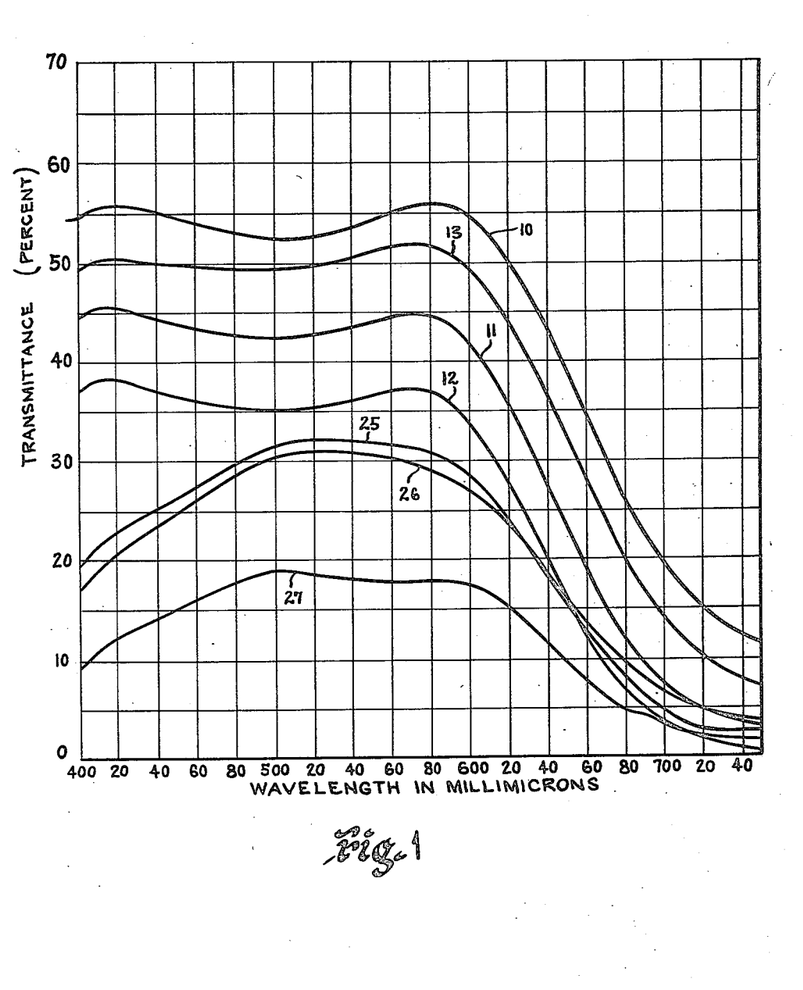
Fig. 1 shows visual transmission curves of substantially neutral colored light transmitting media made in accordance with this invention.

The film at this stage should be thoroughly dried and allowed to oxidize and after drying will possess a definite neutral shade such as is indicated by the curve 10 in Fig. 1 of the drawings. It will be noted that the transmission in the visible spectrum will be substantially level throughout with the exception of the red portion which is greatly cut off to such an extent that there is only a small amount of transmission adjacent the near infra-red region of the spectrum. It is particularly pointed out that the visible ray transmission curve will vary up or down with any change of density of color of the film and the ultra-violet and infra-red absorptive characteristics will vary according to the initial saturation of the film with Solution A and the subsequent chemical reaction during immersion in Solution B.

The ultra-violet ray transmission for the above treated film will be as shown in the following Table B:

Table B

| Wave-length | Percent transmission |
| --- | --- |
| 400 mmu | 20 |
| 390 mmu | 16 |
| 380 mmu | 13 |
| 370 mmu | 10 |
| 360 mmu | 6 |
| 350 mmu | 3.5 |
| 340 mmu | 1.8 |
| 330 mmu | 0.9 |

Such ultra-violet absorption is extremely desirable since, for example, ultra-violet radiation from a television tube will be absorbed by the film, when used as a television filter, whereby the eyes of an observer will be substantially uneffected thereby and the observer's threshold of vision will be maintained at substantially the normal level.

The near infra-red transmission is also substantially cut off.

The method used for measuring the visible transmission is by a GE-Hardy spectrophotometer. The ultra-violet transmission is measured conventionally on a Beckman photometer. It is also to be understood that where "total energy" transmission figures are quoted, the actual infra-red transmission will be less than the "total energy" indication.

The film at this stage should be prevented from further oxidation and made stable by laminating between glass or the like. Such a laminated structure can be formed by cementing the film between two pieces of glass through the use, for example, of a conventional glass cement or other suitable adhesive.

It will be understood that the absorptive, color and other characteristics of various vitreous articles can be closely duplicated by varying the foregoing treatment as described.

While the foregoing Table A recites specific related proportions of the ingredients of Solution A, it is to be understood that the amount of amino hydroquinone di-ethyl ether may vary considerably in accordance with the results desired, as stated above. Di-methyl ether can be used instead of di-ethyl ether if desired. It has been found that the time cycle of immersion in Solution A is only critical when a certain depth of penetration is required. In instances where complete saturation is desired, the time cycle then is negligible and is only required to be for a time interval sufficient to bring about complete saturation and when this point has once been reached continued immersion has no further material effect. Of course, here again the time cycle will vary according to the concentration of the solution.

The time cycle of immersion in Solution B, however, is not critical since the resultant characteristics of the film depends upon the extent of chemical reaction which takes place between Solutions A and B and will depend upon the concentration of Solution A wherein with greater concentrations the time cycle for a given density of color and infra-red or ultra-violet absorption would be proportionately changed with the variation of the concentration. If dense colors are desired, the concentration and/or time cycle are increased proportionately. If a relatively light shade film is desired, with less absorptive characteristics as to infra-red and ultra-violet absorption, the time cycle of immersion in and concentration of Solution A are proportionately controlled.

Referring to Fig. 1, curve 11 indicates the resultant transmission charactersctics when the film is allowed to remain in Solution B as per Table A for only 3 minutes, whereupon the transmission curve is lower than curve 10.

Transmission curve 12 is the result of a film when immersed initially in Solution A containing 6.875 grams of ether for 3 minutes followed by 3 minutes' immersion in the above Solution B. To obtain transmission curve 13, the ether content in Solution A was reduced to 5.625 grams.

Curves 25, 26 and 27 (Fig. 1) illustrate the transmission of films treated by immersion in variations of Solutions A and B and different time cycles. Curve 25 results from immersion first for 3 minutes in a Solution A containing 40 grams of diethyl ether in 1000 cc. of alcohol followed by 3 minutes' immersion in a Solution B containing 10 grams of copper salts in 1000 cc. of alcohol. Curve 26 results from immersion first for 8 minutes in a Solution A containing 20 grams of diethyl ether in 1000 cc. of alcohol followed by immersion for 3 minutes in a Solution B containing 10 grams of copper salts in 1000 cc. of alcohol.

Curve 27 results from immersion first for 3 minutes in a Solution B containing 40 grams of copper salts in 1000 cc. of alcohol followed by 3 minutes' immersion in a Solution A containing 20 grams of ether in 1000 cc. of alcohol.

Figure 2:
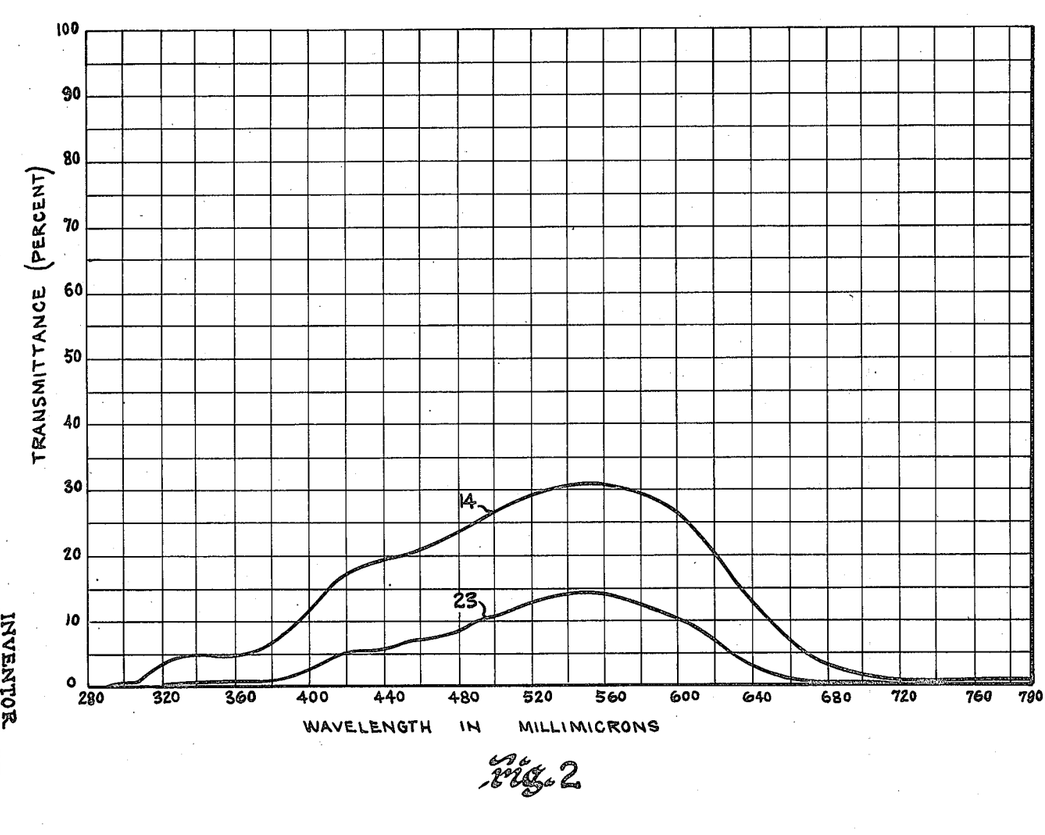
Fig. 2 illustrates the transmission curves of laminated and unlaminated blue-green colored media made in accordance with this invention.

Although the foregoing refers specifically to a plastic film which has been immersed first in Solution A and subsequently in Solution B for producing a resultant neutral film satisfactory for use such as with television screens, this process can be varied to produce films having other desired color characteristics. For example, if it is desired to duplicate the blue-green color such as is desired for sun glass lenses, a film of the above character will initially be immersed for 3 minutes in Solution B, as given in the foregoing Table A, the surface thereof wiped dry of excess solution, the film then allowed to thoroughly dry and oxidize, and subsequently immersed until reaction is completed in Solution A and allowed to dry and oxidize. The film then will be provided with the desired blue-green color and will have a visible transmission curve at a thickness of 1.22 mm. as shown by numeral 14 in Fig. 2 of the drawings wherein it will be seen that the infra-red transmission is practically all eliminated and the ultra-violet transmission is negligible.

Figure 3:
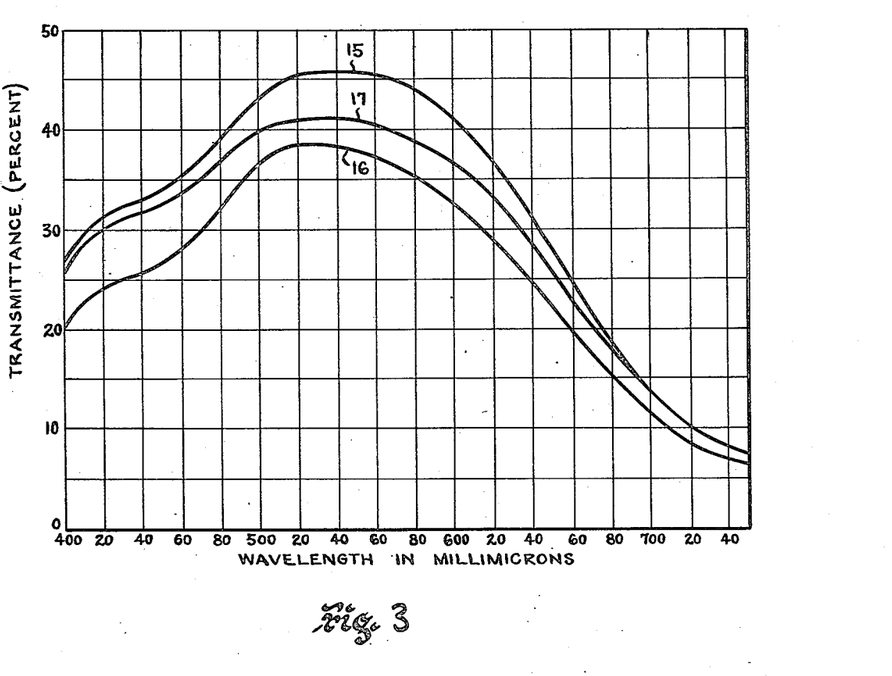
Fig. 3 are visual transmission curves of other blue-green media.

Another example of this feature is illustrated by curve 15 in Fig. 3 which illustrates the visual transmission resulting from immersion of the film first in Solution B and subsequently in Solution A (both solutions as per Table A) when the time of immersion in each solution is held to 3 minutes.

Curve 16 illustrates the result when the ether has been increased by 10% in Solution A to 6.875 grams and the times of immersion held to 3 minutes in each solution.

Curve 17 is the result when the ether has been reduced 10% to 5.625 grams and all other factors held constant.

To produce in a film a rose-smoke color which may be desirable in certain instances, the film can be immersed successively in Solutions A and B as given in Table A with or without the oxidizing period and subsequently immersed in a third solution which we shall designate as Solution C containing alcohol having controlled amounts of Uniperox 60 or tertiarybutyl hydroperoxide dissolved therein.

Uniperoxide 60 is an organic hydroperoxide concentrate composed of cyclic hydrocarbon hydroperoxides containing 6 to 8 carbon atoms and having an empirical formula of $C_7H_{13}OOH$ and a molecular weight of 130.

Figure 4:
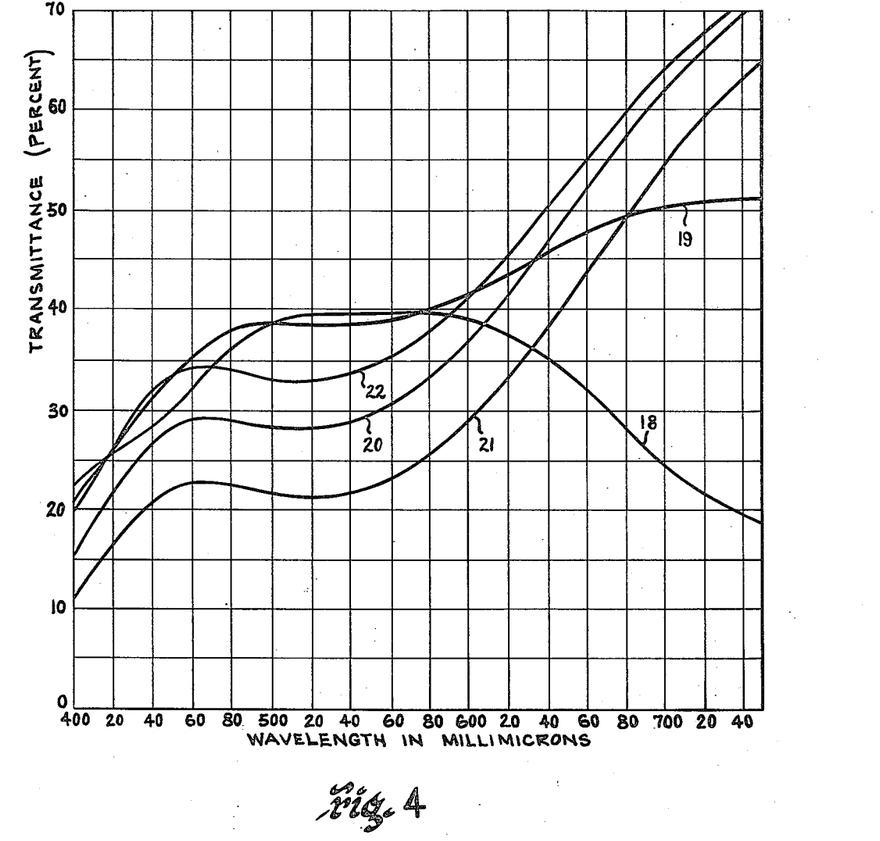
Fig. 4 are visual transmission curves of rose-smoke colored media made in accordance with this invention.

For example, a film treated with Solutions A and B as per Table A and subsequently immersed for 3 minutes in Solution C containing 2000 cc. of alcohol and at least 17 cc. of Uniperox 60 will be provided with the desired rose-smoke color. Such a film will have a transmission curve such as illustrated in Fig. 4 of the drawings. It will be noted in Fig. 4 that a change in the amount of Uniperox 60 from 17 cc. to 21 cc. will result in a decided change in the visible transmission curve, numeral 18 in Fig. 4 indicating the transmission curve of a plastic film which has been immersed in a Solution C containing 17 cc. of Uniperox 60 and numeral 19 indicating the curve of a film immersed in a Solution C containing 21 cc. of Uniperox 60.

Figure 6:
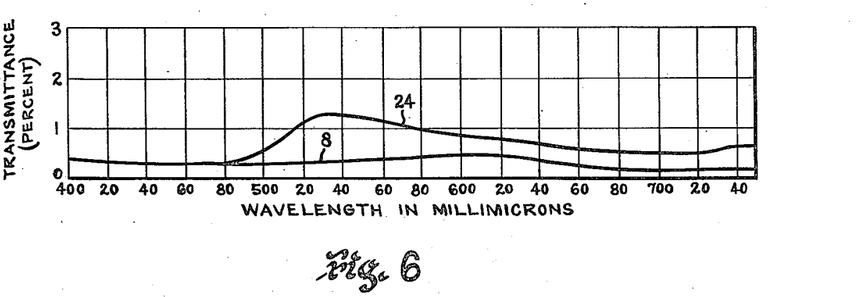
Fig. 6 are visual transmission curves of media formed in accordance with this invention which are suitable for welding purposes.

Another example of a rose-smoke colored film can be made by immersing the film in a Solution A containing 40 grams of ether in 1000 cc. of alcohol for 5 minutes, followed by 5 minutes' immersion in a Solution B containing a saturated solution of copper salts in 1000 cc. of alcohol. The result will be a very dark rose-smoke color having a transmission curve as shown by 23 in Fig. 6. Such a color is especially suitable for welding purposes.

Another green color suitable for welding can be produced by immersion of a film for the same time cycles in the same solutions just given above only immersing first in Solution B followed by immersion in Solution A. The resulting visual transmission curve is indicated at 24 in Fig. 6.

A film immersed for 3 minutes in each of Solutions A and B as per Table A followed by 3 minutes' immersion in Solution C containing 10% Uniperox 60 in alcohol will produce rose-smoke color with a visual transmission curve as indicated by numeral 20 in Fig. 4. Curve 21 results when a film is similarly treated with the exception that the ether in Solution A has been increased to 6.875 grams. To produce curve 22 the same procedure is used except that the ether was reduced to 5.625 grams. However, it is extremely interesting to note that by eliminating the oxidizing periods after immersion in Solutions A and B, the oxidation can be accomplished by immediately immersing the film in a Solution C for approximately three minutes, with Solution C containing approximately 10 cc. Uniperox 60, whereupon the resultant film will be provided with the neutral color similar to that produced by the first abovementioned process. Decreasing the amount of Uniperox 60 will tend to produce in the resultant film a slight bluish color which, while not preferred, is acceptable. Increasing the amount of Uniperox 60 in Solution C will tend to change the color of the resultant film toward reddish or rose-smoke color.

It is particularly pointed out that plastic materials treated as described above are preferably formed in sheet or foil form and after treatment, sandwiched between plates of suitable glass in the conventional manner as described above.

It is to be further understood that a laminated structure can be still further varied as to density by superimposing a plurality of sheets of treated film upon one another, with the number of sheets used being dependent upon the density desired. A characteristic curve resulting from the above is shown at 28 in Fig. 4.

Although to a scientist a complete specification of the colors desired for the glasses of this invention can be read from the transmission curves shown in the drawings, in order to better define the color limits which are acceptable within the scope of this invention the colors may be further defined by using the standard observer and coordinate system adopted in 1931 by the International Commission on Illumination. These specifications will all be given in terms of the standard ICI illuminant C, representative of average daylight, of a standard observer, and of a standard thickness of 2.0 millimeters.

Figure 5:
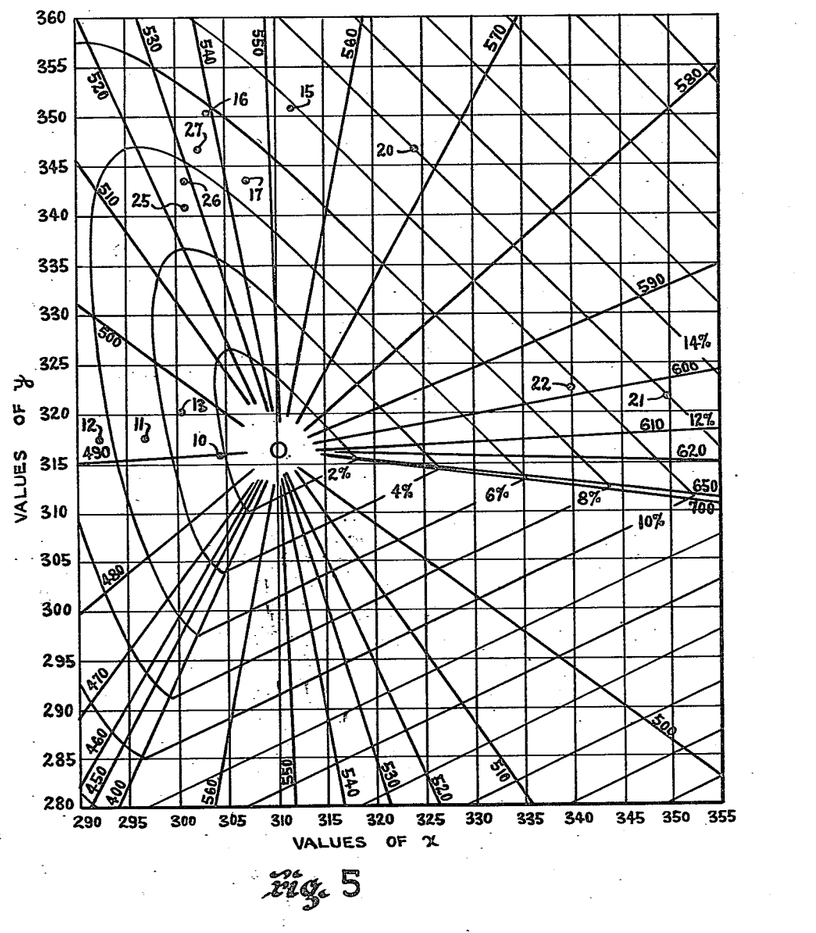
Fig. 5 is a tri-chromaticity diagram illustrating the colors of several of the media described in the present application.

With reference to Fig. 5 of the accompanying drawings, there is given a plot of the $x$ and $y$ coordinates in the aforementioned color specification system and the color qualities derived from them, namely the dominant wavelength and the purity of the color being described. The third attribute of color, brightness, as derived from Y, has been found to agree almost exactly with the physical property visual transmission previously discussed.

Referring to Table C which follows, the data given summarizes all of the color specification data by the ICI system of some of the foregoing examples, listing the chromaticity coordinates for Illuminant C:

*Table C*

| Transmission Curve No. | $x$ | $y$ | Dominant Wavelength, mu | Purity, percent | Visual Transmission, percent |
|---|---|---|---|---|---|
| 10 | 0.3044 | 0.3158 | 491 | 2.1 | 53.3 |
| 11 | 0.2965 | 0.3172 | 492 | 5 | 42.6 |
| 12 | 0.2924 | 0.3171 | 492 | 6.5 | 35.0 |
| 13 | 0.3018 | 0.3201 | 497 | 2.8 | 49.9 |
| 15 | 0.3114 | 0.3513 | 553 | 9.9 | 43.2 |
| 16 | 0.3032 | 0.3506 | 538 | 7.7 | 35.5 |
| 17 | 0.3069 | 0.3438 | 545 | 6.8 | 38.8 |
| 20 | 0.3468 | 0.3243 | 598 | 12 | 31.8 |
| 21 | 0.3494 | 0.3215 | 602 | 12 | 24.4 |
| 22 | 0.3396 | 0.3229 | 598 | 9.8 | 36.7 |
| 23 | 0.3585 | 0.3302 | 594 | 17 | 0.35 |
| 24 | 0.3692 | 0.4579 | 565.5 | 54 | 0.98 |
| 25 | 0.3006 | 0.3416 | 525 | 5 | 30.4 |
| 26 | 0.3007 | 0.3445 | 528 | 5.8 | 29.1 |
| 27 | 0.3019 | 0.3469 | 533 | 6.6 | 18.2 |

Because of its resistance to heat, its flexibility and general all-around workability, polyvinyl alcohol is particularly desirable as a medium for forming a heat screen or as a welder's filter. In treating such a plastic, according to the herein described process, water would be the preferred solvent since the polyvinyl alcohol is resistant to the alcohols used in treating cellulose acetate and the like. It has also been found desirable to add a small amount of a strong oxyacid such as sulphuric or nitric acid to Solution A containing the ether. This assists in enabling the ether to more satisfactorily dissolve or mix with the water. It also appears to have a stabilizing effect on the transmission characteristics imparted to the plastic as a result of the described bathing. The acid may be either first mixed with the ether and then the mixture of the two added to the water. Alternatively, a small amount of the acid may be first mixed with the water and then the amino hydroquinone di-alkyl ether dissolved therein.

As illustrative of the process of treating water soluble plastics, an excellent infra-red and ultra-violet absorbing plastic having relatively high transmission in the visible region may be formed as follows:

A Solution A is formed by dissolving together 5 cc. of concentrated sulphuric acid and 2 grams of amino hydroquinone di-ethyl ether. This solution is then poured into 50 cc. of water and 50 cc. of a 5% solution of sodium hydroxide slowly added thereto to obtain a pH value of about 1.0 to 1.5. It has been found that best results are obtained when the Solution A is so neutralized because of the relatively large amount of acid present.

Figure 7:
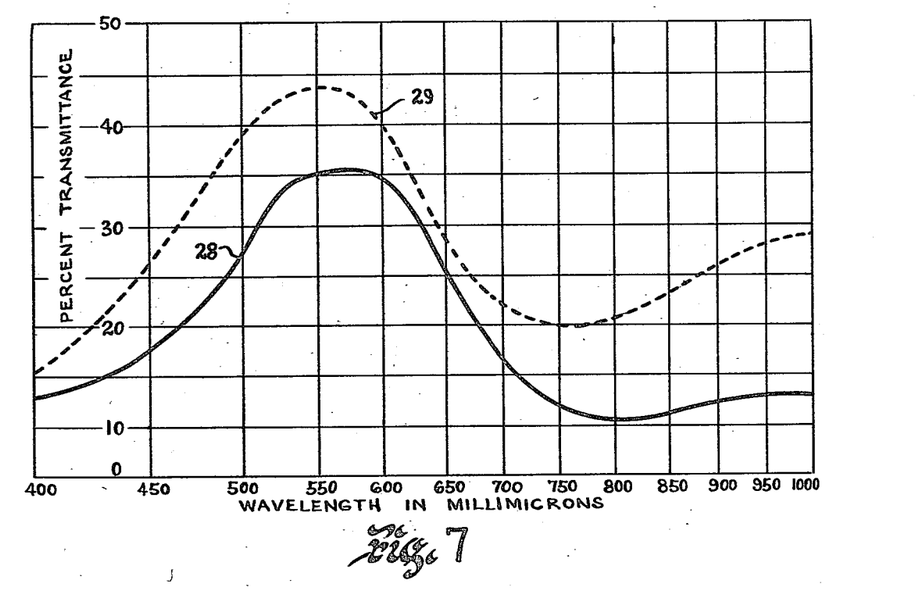
Fig. 7 are transmission curves of light-transmitting media of the water soluble type formed in accordance with this invention illustrating the use of both sulphuric acid and nitric acid for their stabilizing effect.

A Solution B is formed by adding 5 grams of cupric chloride and 10 grams of sodium chloride to 100 cc. of water. The sodium chloride lessens the tendency of the polyvinyl alcohol film to be otherwise dissolved by the water. The polyvinyl alcohol was then imbibed in Solution A containing the amino hydroquinone di-ethyl ether for about five minutes. A clouding effect was noted in the film which indicated a penetration of the material. This subsequently cleared and the film was then removed and dried. It was then imbibed in Solution B containing the cupric chloride for a similar length of time, removed and dried. The film had now taken a green or green-yellow-green color which did not change. Readings taken of its light transmission gave a characteristic shape in the visible region as indicated in Fig. 7 by reference numeral 28. In the invisible regions on either side, the following values were determined:

Table D

| Ultra-Violet | | Infra-Red | |
|---|---|---|---|
| Wavelength, mmu | Transmission, percent | Wavelength, mmu | Transmission, percent |
| 405 | 14.5 | 1,000 | 12.0 |
| 400 | 13.0 | 1,200 | 11.5 |
| 390 | 11.1 | 1,400 | 13.5 |
| 380 | 9.2 | 1,600 | 15.5 |
| 370 | 7.4 | 1,800 | 18.5 |
| 365 | 6.2 | 2,000 | 20.5 |
| 360 | 5.5 | 2,200 | 23.5 |
| 350 | 4.0 | 2,400 | 25.5 |
| 340 | 2.9 | 2,600 | 28.0 |
| 334 | 2.0 | 2,800 | 1.5 |
| 320 | 0.5 | 3,000 | 0.5 |
| 313 | 0.4 | 3,200 | 0.5 |
| 300 | 0.2 | 3,400 | 0.5 |
| 290 | 0.1 | 3,600 | 5.5 |
| 280 | <.02 | 3,800 | 13.0 |
| 200 | | 4,000 | 25.5 |

Below 280 to 210 mmu, a reading of less than .02% was noted while at 200 mmu, there was no indication of any measurable ultra-violet radiation present.

If desired, instead of initially mixing the oxyacid with the amino hydroquinone di-alkyl ether and adding the mixture to the water, the following alternative procedure of forming Solution A may be used. To 100 cc. of water, add .25 cc. or higher of the oxyacid (either sulphuric or nitric acid), then dissolve the two grams of amino hydroquinone di-ethyl ether in the weak acid solution. In this alternative process, it has been found that the neutralization step involving the use of an alkali hydroxide such as sodium hydroxide may be omitted. Curve 29 in said Fig. 7 indicates the transmission characteristics obtained for a polyvinyl alcohol film which is treated according to this alternative process, the oxyacid used being nitric acid.

Although .25 cc. represents a useful value for the proportion of oxyacid, up to 1.0 cc. might be used per 100 cc. of water. Of course, this does not mean that larger amounts of acid cannot be used. However, with larger amounts of acid, a neutralizing agent such as the above-mentioned alkali hydroxide should also be added to maintain the pH to between 1 and 1.5.

This marked cutoff in both the ultra-violet and the infra-red regions as compared with a relative high peak in the visible region has been found to improve the higher concentrations of both the metal salt and the di-alkyl ether in their respective solutions. Good results are obtained when the copper or iron chloride is added to 100 cc. of water in from 2 to 25 grams and in the case of the di-alkyl ether from 1 to 5 grams per 100 cc. of water. It is interesting to note that when treating polyvinyl alcohol and the like films, best results are obtained when the film is first bathed in the amino hydroquinone di-alkyl solution (Solution A) and then into Solution B containing the metal salt. Even better results are obtained when the polyvinyl alcohol film is bathed first in the di-alkyl ether solution, then in the metal salt solution followed by a further bath in the di-alkyl ether solution.

For example, a Solution A was made up as follows:

Water _______________________________________cc__ 100
Sulphuric acid (conc.) _______________________cc__ .25
Amino hydroquinone di-alkyl ether ________grams__ 4

A Solution B was made up as follows:

Water _______________________________________cc__ 100
Copper chloride (CuCl$_2$.2H$_2$O) ____________grams__ 20
Sodium chloride ______________________________do__ 10

A film of polyvinyl alcohol, of a thickness of about .015", was imbibed in Solution "A" for approximately three minutes or until it had turned cloudy indicating penetration of the material and then cleared again, remaining substantially colorless. The film was then removed and wiped to remove excess solution, then into Solution "B" for three minutes, and back again into Solution "A" for from three to five minutes. On removal from Solution "B" it had a dark green color which was replaced by a yellow on being reimbibed in Solution "A." It was then heated for 30 minutes at 118° F. to dry. The duration of heating would vary according to the temperature used, a preferred range of heating being from about 90° to 130°. Obviously, the temperature should be high enough to be efficient and low enough to prevent charring of the film. The resultant film had a transmission curve in the visible region as indicated by 30 in Fig. 8 while in the invisible region, the following interesting data was obtained:

Table E

| Ultra-Violet | | Infra-Red | |
|---|---|---|---|
| Wavelength, mmu | Transmission, percent | Wavelength, mmu | Transmission, percent |
| 405 | <.02 | 1,000 | 11.0 |
| 400 | 2.2 | 1,200 | 10.0 |
| 390 | 1.1 | 1,400 | 17.0 |
| 380 | 0.5 | 1,600 | 24.0 |
| 370 | .35 | 1,800 | 32.5 |
| 365 | .15 | 2,000 | 40.0 |
| 360 | .21 | 2,200 | 45.0 |
| 350 | .41 | 2,400 | 49.5 |
| 340 | .75 | 2,600 | 54.0 |
| 334 | 1.12 | 2,800 | 13.0 |
| 320 | 1.6 | 3,000 | 0.5 |
| 313 | .75 | 3,200 | 0.5 |
| 300 | <.02 | 3,400 | 0.5 |
| 290 | <.02 | 3,600 | 12.5 |
| 280 | .10 | 3,800 | 23.5 |
| 270 | .40 | 4,000 | 40.0 |
| 260 | .80 | | |
| 250 | .15 | | |
| 240 | <.02 | | |
| 230 | <.02 | | |
| 220 | <.02 | | |
| 210 | <.02 | | |

Figure 8:
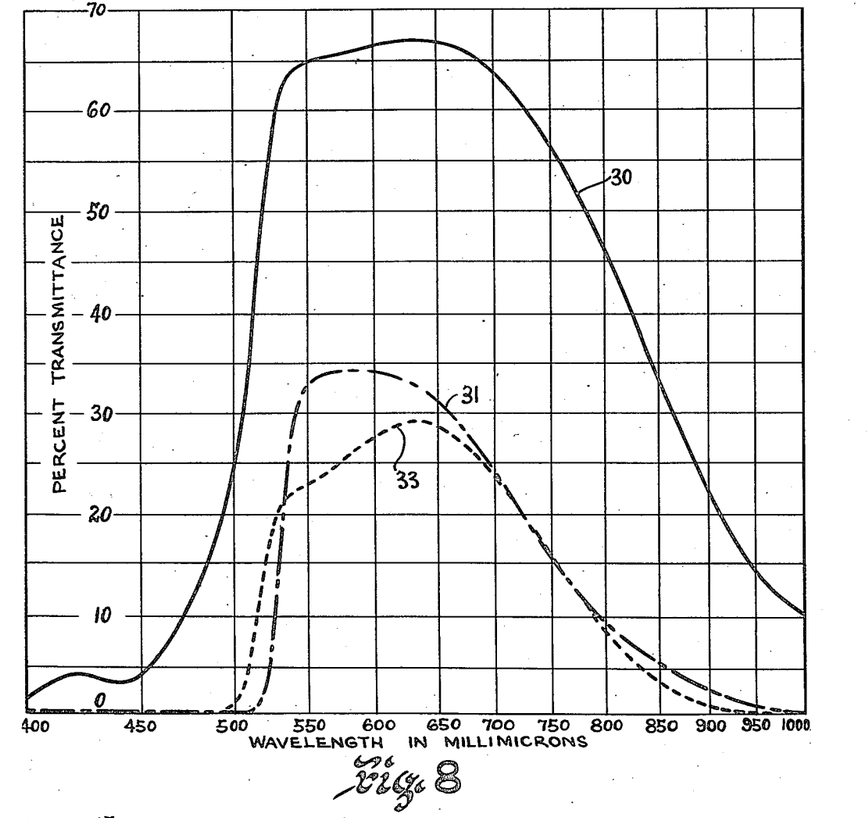
Fig. 8 are transmission curves of polyvinyl alcohol material formed in accordance with this invention illustrating the use of both cupric and ferric chlorides as the metal salt.

Substituting 20 grams of ferric chloride (FeCl$_2$.6H$_2$O) for the copper chloride in the preceding example and using the same process of imbibing first in the amino hydroquinone di-ethyl ether, then in the ferric chloride solution, back again into the amino hydroquinone di-ethyl ether solution and then heating for 30 minutes at 118° F. produced the polyvinyl alcohol film with a transmission curve as indicated at 31 in Fig. 8. Proportion for proportion, the iron chloride seems to have a stronger effect both in the visible and also in the infra-red and ultra-violet regions as well. On the ultra-violet side of the visible spectrum its transmission cuts off at about 510 to less than .02 of 1% and stays there to 220 millimicrons. On the other side of the visible spectrum in the infra-red region at 1000 millimicrons, the reading was 0.00% transmission and remained below 1.0% out to 4000 millimicrons as indicated in the following table:

| Ultra-Violet | | Infra-Red | |
|---|---|---|---|
| Wavelength, mmu | Transmission, Percent | Wavelength, mmu | Transmission, Percent |
| 405 | <.02 | 1,000 | 0.00 |
| 365 | <.02 | 1,200 | 0.00 |
| 334 | <.02 | 1,400 | 0.00 |
| 313 | <.02 | 1,600 | 0.00 |
| 220 | <.02 | 1,800 | 0.00 |
| | | 2,000 | 0.00 |
| | | 2,200 | 0.00 |
| | | 2,400 | 0.00 |
| | | 2,600 | 0.10 |
| | | 2,800 | 0.10 |
| | | 3,000 | 0.00 |
| | | 3,200 | 0.00 |
| | | 3,400 | 0.00 |
| | | 3,600 | 0.20 |
| | | 3,800 | 0.50 |
| | | 4,000 | 0.90 |

Thus, iron chloride is particularly useful since it is both inexpensive per quantity and much smaller amounts need be used than, for example, the cupric chloride to obtain desired absorption.

The sulphuric acid may be replaced by nitric acid with equally good results. For example a Solution A was made up as follows:

| | |
|---|---|
| Water _________________________________ cc__ | 100 |
| Nitric Acid _____________________________ cc__ | 1 |
| Amino hydroquinone di-ethyl ether _______ grams__ | 3 | and a Solution B as follows:

| | |
|---|---|
| Water _________________________________ cc__ | 100 |
| Ferric chloride _________________________ grams__ | 20 |

A similar strip of polyvinyl alcohol as in the previous examples was first bathed in Solution A for about four minutes, then on being removed and wiped to remove excess solution, it was bathed in Solution B for one minute, again on removal, wiped and finally re-immersed in Solution A for about four minutes. After being heated for approximately 40 minutes at 118° F. to dry the same, it was found to have the characteristic curve as indicated at 34 as indicated in Fig. 8 which nearly duplicates the transmission curve obtained when sulphuric acid was used in the previous example.

Although the explanation is not completely understood, the further imbibing of the film in the amino hydroquinone di-alkyl ether solution which causes the film to lose the green color it obtained from its imbibition in the metal chloride bath and to take on a more distinctly yellow color is possibly explained because indications are that the iron or copper has been more completely converted to the ferrous or cuprous form.

The fact that the film, after having been stabilized by the heat, retains a yellow color can be taken advantage of to produce almost any desired color of film according to individual preference and while still maintaining the substantially complete cutoff in the ultra-violet and infra-red regions.

For example, stock solutions of Cyan, Magenta and yellow dyestuff may be made up as follows:

Table F

| Cyan | Magenta | Yellow |
|---|---|---|
| Water, 300 cc Pontamine fast green 5 BL, 4 gr. | Water, 300 cc Solantine Red 8L, 4 gr. | Water, 300 cc. Metanil yellow, 4 gr. |

In the Cyan stock solution, the pontamine fast green 5 BL may be replaced by Sky blue 6 BX greenish or any other of the so-called textile type or all cotton aniline dyes producing a green. A substitute for the Solantine Red 8L in the Magenta stock solution might be Erie Cardinal 7B and in the case of the yellow stock solution, pontamine yellow CH or Solantine Yellow G. L. might replace the Metanil yellow. It is to be understood that the above examples are not to be used in a limiting sense but are merely illustrative of how stock solutions might be produced to carry out this part of the process.

Having prepared the three stock solutions of dyestuff, proportions thereof may be mixed together according to the color desired and diluted in a mixture of water and alcohol. For example, in producing one shade of green, the following dye solution might be used:

Table G

| | Cc. |
|---|---|
| Cyan dye stock _________________________ | 60 |
| Magenta dye stock ______________________ | 10 |
| Yellow dye stock ________________________ | 30 |
| Water __________________________________ | 70 |
| Alcohol ________________________________ | 30 |

However, the film being dyed already has a yellow color so that substantially the same shade of green might be obtained by omitting the 30 cc. of yellow dyestock from the above. Of course, if the resultant color were not yellow enough, a part or all of the 30 cc. of yellow dyestock could be used. Likewise, applicant has found that the following produces a very desirable rose smoke colored film that is acceptable for sun glass use and the like:

Table H

| | Cc. |
|---|---|
| Magenta dye stock ______________________ | 60 |
| Cyan dye stock _________________________ | 10 |
| Water __________________________________ | 70 |
| Alcohol ________________________________ | 30 |

Having formed the specific dye solution desired, the film having been first bathed in Solution A, then into Solution B and back into Solution A, as discussed previously, is wiped to remove excess "A" solution and then is bathed in the dye solution for approximately five minutes, the film then removed, wiped to remove excess dye solution and heated for 30 minutes, as mentioned previously. Note that it is not essential that the film be heat treated before the dyeing step, but that preferably the dyeing step should precede the heating.

Although the preceding discussion relates to the bathing of the films with Solutions A and B, it is entirely conceivable that at the time of casting the films, the amino hydroquinone di-alkyl ether might be incorporated in the plastic and this film bathed in a Solution B only.

Figure 9:
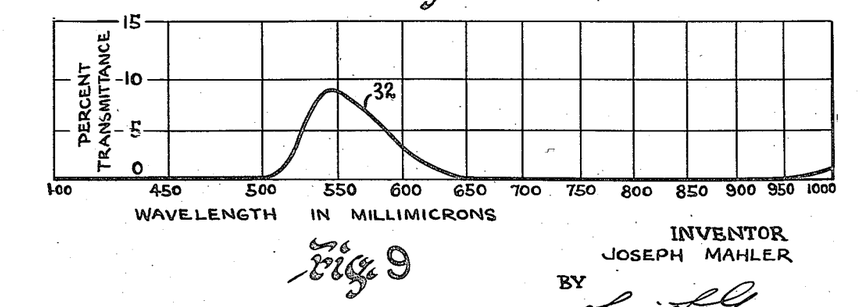
Fig. 9 is a transmission curve of a polyvinyl alcohol film wherein the amino hydroquinone di-alkyl ether was initially cast in the film and the film then bathed with the metal salt containing solution.

For example, a Solution A was made up as follows: 2 grams of ether were added to 100 cc. of water containing .25 cc. of sulphuric acid. A casting solution embodying 100 cc. of polyvinyl alcohol dope and 10 cc. of said Solution A was formed and a film formed therefrom according to conventional casting technique. This film was then bathed for three minutes in a Solution B embodying 5 grams of ferric chloride mixed with 100 cc. of water. The resultant film had a green yellow green color and a transmission curve as indicated at 32 in Fig. 9. In the infra-red and ultra-violet regions, there was a substantially complete cutoff except for a very slight rise around 1000 mmu which, however, is still well below 1%.

Figure 10:
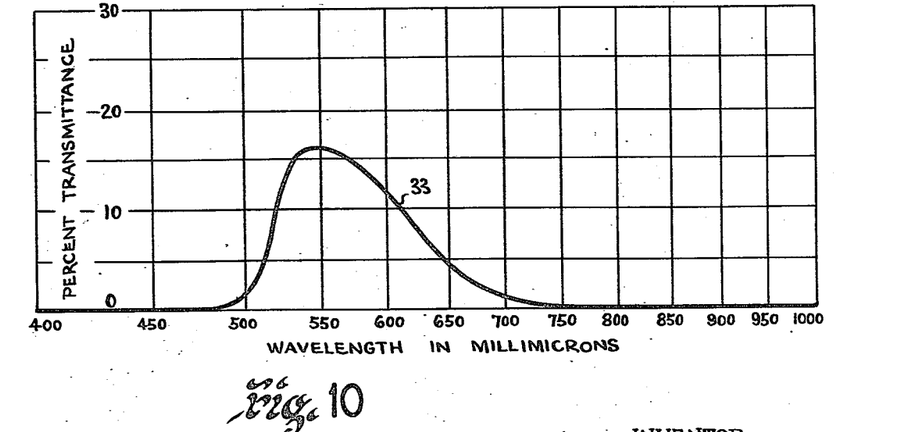
Fig. 10 is a transmission curve of a cellulose media treated in accordance with this invention and using a strong oxy-acid for its stabilizing effect.

Although the preceding discussion of the use of a strong oxyacid has been to the treatment of polyvinyl alcohol films and the like wherein the solvent of Solution A is water, the presence of similar acids in similar proportions may be advantageously added to Solutions A wherein the solvent is an alcohol, and is used to treat cellulose acetate, cellulose nitrate, ethyl cellulose, etc. The acid contained in such Solutions A helps to stabilize the absorption characteristics of the treated films. For example, a film of cellulose acetate was first bathed for three minutes in a Solution B embodying 20 grams of cupric chloride in 100 cc. of alcohol, wiped to remove excess solution and then bathed for three minutes in a Solution A embodying 100 cc. of ethyl alcohol, .25 cc. of sulphuric acid and 2 grams of amino hydroquinone di-ethyl ether. The resultant film had a green yellow green color and a transmission curve as indicated at 33 in Fig. 10. In the infra-red and ultra-violet regions, the following interesting data was obtained.

Table J

| Ultra-Violet | | Infra-Red | |
|---|---|---|---|
| Wavelength, mmu | Transmission, Percent | Wavelength, mmu | Transmission, Percent |
| 405 | .85 | 1,000 | <.5 |
| 400 | .95 | 1,200 | .5 |
| 390 | .75 | 1,400 | .0 |
| 380 | .55 | 1,600 | .0 |
| 365 | .58 | 1,800 | <.5 |
| 360 | .49 | 2,000 | .5 |
| 350 | .81 | 2,200 | 1.0 |
| 340 | .65 | 2,400 | 1.5 |
| 334 | 1.02 | 2,600 | 4.0 |
| 320 | 1.08 | 2,800 | 1.5 |
| 313 | .75 | 3,000 | 1.0 |
| 300 | .25 | 3,200 | 6.5 |
| 290 to 210 | <.02 | 3,400 | <.5 |

The transmission values of the films formed in accordance with the above were rechecked weekly over a period of weeks and although there was noticed some slight drop in the visible peak in the first week, the characteristic shape of the curve into both the infra-red and utlra-violet regions remained stable. No further perceptible change was apparent in succeeding rechecks. In such instances, therefore, the process should include a period for seasoning or ageing.

Using lesser amounts of the metal salt does not seem to materially change the characteristic shape of the transmission curve, but only to raise the transmission level through the whole measured section of the spectrum. For example a Solution B containing 10 instead of 20 grams of cupric chloride was used with the result that the peak transmission of the film in the visible region (around 550 mmu) rose from about 16% as in the case of the preceding example (curve 33 in Fig. 10) to about 32% while in the infra-red regions the percentage transmission at 1000 mmu was about 1%, at 2000 mmu 15% and at 3000 mmu 1.5%.

While the preferred features of the invention have been described and are pointed out in the annexed claims, it will be understood that many changes may be made without departing from the spirit of the invention. I, therefore, do not wish to be limited to the exact features described as the preferred only are set forth by way of illustrations.

I claim:

1. A transparent synthetic plastic material containing dispersed in the body thereof organo-metallic compounds which are the reaction product of a cupric chloride and amino hydroquinone di-alkyl ether, the material having controlled absorption of light rays in the visible region of the spectrum and absorption in the near infra-red region of the spectrum, with the absorption of the infra-red rays being of an amount greater than the visible.

2. A transparent synthetic plastic material containing dispersed therein organo-metallic compounds which are the reaction product of a cupric chloride and amino hydroquinone di-alkyl ether, the material having controlled absorption in the visible region of the spectrum, absorption in the near infra-red region of the spectrum and absorption in the ultra-violet region, with the absorption of the infra-red and ultra-violet rays being of an amount greater than the visible.

3. A transparent light absorbing synthetic organic plastic having organo-metallic compounds disposed within the structure thereof which are the reaction product of a cupric chloride and amino hydroquinone di-alkyl ether, said product providing the organic plastic with controlled absorption of the rays of the visible portion of the spectrum and of the near infra-red and ultra-violet regions of the invisible portions of the spectrum.

4. A transparent light absorbing organic plastic having organo-metallic compounds disposed within the structure thereof, said compounds being the reaction product of a cupric chloride and amino hydroquinone di-alkyl ether and providing controlled absorption of the rays of the visible portion of the spectrum and of the near infra-red region of the spectrum, with the absorption of the infra-red rays being of an amount greater than the visible, and having controlled absorption of rays of the ultra-violet region of the spectrum.

5. A transparent neutral colored synthetic plastic containing the reaction product of a cupric chloride and amino hydroquinone di-alkyl ether, said product providing the plastic with visible ray transmission of approximately 55% at 400 mu, approximately 52% at 500 mu, approximately 55% at 600 mu, a marked cutoff of visible rays beyond 600 mu, and ultra-violet and infra-red ray absorption characteristics, with said infra-red ray absorption characteristics being of an amount greater than the absorption of the visible rays.

6. The method of treating transparent synthetic plastic materials so as to provide said materials with selective absorption as to certain of the rays of the visible spectrum and controlled absorption as to the near infra-red portion of the spectrum, with said absorption of the infra-red portion of the spectrum being greater than the absorption of the visible region of the spectrum, comprising immersing said materials in a solution containing an organic solvent capable of penetrating the plastic material being treated and having dissolved therein a controlled amount of an amino hydroquinone ether selected from the group consisting of dimethyl and diethyl ether, said immersion being for a controlled time interval sufficient to cause the material to absorb the solution to the desired extent, drying said material, immersing said material in a second solution embodying a controlled amount of a soluble cupric chloride which will react with said ether dissolved in a suitable organic solvent also capable of penetrating the plastic article being treated, said latter immersion being for a time interval sufficient to permit the ingredients in said second solution to sufficiently penetrate said material and to react with the compound of said first solution carried by the material to form an organo-metallic compound within the material to produce the absorption characteristics desired of the resultant material, and subsequently thoroughly drying.

7. The method of treating transparent synthetic plastic materials so as to provide said materials with selective absorption as to certain of the rays of the visible spectrum and controlled absorption as to the infra-red and ultra-violet portions of the spectrum, with said absorption of the infra-red portion of the spectrum being greater than the absorption of the visible region of the spectrum, comprising immersing said materials in a solution containing approximately 1000 cc. of alcohol having dissolved therein approximately 6.25 grams of amino hydroquinone diethyl ether, said immersion being for a controlled time interval sufficient to cause the material to absorb said solution to the desired extent, drying said material, immersing said material in a second solution containing approximately 1000 cc. of alcohol having dissolved therein approximately 25 grams of cupric chloride, said latter immersion being for a time interval sufficient to permit the compounds in said second solution to sufficiently penetrate said material and to react with the compound of said first solution carried by the material to form an organo-metallic compound within the material, and thoroughly drying said material to produce visual transmission in the article of approximately 55% at 400 mu, approximately 52% at 500 mu, approximately 55% at 600 mu, and less beyond 600 mu, infra-red absorption of an amount greater than the absorption in the visible spectrum, and ultra-violet transmission not exceeding 6% at 360 mu and less at shorter wave-lengths.

8. An infra-red and ultra-violet absorbing synthetic plastic comprising a transparent organic plastic that is soluble in organic solvent and containing dispersed therein the reaction product formed in situ of a cupric chloride and an amino hydroquinone di-alkyl ether, said reaction product providing the plastic with the infra-red and ultra-violet absorbing characteristics.

9. An infra-red and ultra-violet absorbing synthetic plastic comprising a transparent organic plastic containing the reaction product formed in situ of cupric chloride and an amino hydroquinone di-alkyl ether dispersed therein, said reaction product providing the plastic with the infra-red and ultra-violet absorbing characteristics.

10. An infra-red and ultra-violet absorbing synthetic plastic comprising a transparent organic plastic containing dispersed therein the reaction product formed in situ of cupric chloride with amino hydroquinone di-alkyl ether and a cyclic hydrocarbon hydroperoxide containing 6 to 8 carbon atoms, said reaction product providing the infra-red and ultra-violet absorbing characteristics.

11. The method of treating transparent synthetic plastic material so as to impart light-absorption characteristics to said material comprising immersing said materials in a solution containing alcohol having dissolved therein an amino hydroquinone ether selected from the group consisting of dimethyl and diethyl ether, said immersion being for a time interval sufficient to cause the material to absorb the solution to the desired extent, drying said material, immersing said material in a second solution embodying a soluble cupric chloride which will react with said ether dissolved in alcohol and which is capable of penetrating the plastic material, said latter immersion being for a time interval sufficient to permit the ingredients in said second solution to sufficiently penetrate said material and to react with the compound of said first solution carried by the material to form an organo-metallic compound within the material to produce the desired absorption characteristics in the resultant material, and subsequently thoroughly drying.

12. The method of treating transparent synthetic plastic material so as to impart light-absorption characteristics thereto comprising in sequence immersing said material in a first solution containing an organic solvent capable of penetrating the plastic material being treated and having dissolved therein a controlled amount of an amino hydroquinone ether compound selected from the group consisting of dimethyl and diethyl ether, then in a second solution embodying a soluble cupric chloride which will react with said ether dissolved in an organic solvent capable of penetrating the plastic material being treated, and in a third solution embodying a cyclic hydrocarbon hydroperoxide compound containing from six to eight carbon atoms also dissolved in an organic solvent capable of penetrating the plastic material being treated, each immersion being for a time interval sufficient to permit the ingredients in the several solutions to sufficiently penetrate said material, said compounds of the three solutions reacting within the body of the material to form an organo-metallic compound whereby the desired absorption characteristics are imparted to the material.

13. An infra-red and ultra-violet absorbing transparent synthetic organic plastic containing substantially uniformly dispersed therethrough the reaction product of a cupric chloride with amino hydroquinone di-alkyl ether and cyclic hydrocarbon hydroperoxide containing six to eight carbon atoms.

14. An infra-red and ultra-violet absorbing transparent synthetic organic plastic containing substantially uniformly dispersed therethrough the reaction product of cupric chloride with amino hydroquinone di-alkyl ether and tertiary butyl hydroperoxide.

15. An infra-red and ultra-violet absorbing transparent synthetic organic plastic containing substantially uniformly dispersed therethrough the reaction product of a cupric chloride with amino hydroquinone di-alkyl ether and an organic compound from the group consisting of tertiary butyl hydroperoxide and a cyclic hydrocarbon hydroperoxide containing six to eight carbon atoms.

16. A transparent stabilized light absorbing synthetic organic plastic having substantially uniformly distributed therethrough the reaction product of a cupric chloride and amino hydroquinone di-alkyl ether providing controlled absorption of the rays of the visible, ultra-violet and infra-red regions of the spectrum and being disposed between two layers of transparent material for preventing oxidation.

17. An infra-red and ultra-violet absorbing transparent synthetic organic plastic containing substantially uniformly dispersed therethrough the reaction product of amino hydroquinone di-alkyl ether and a chloride from the group consisting of ferric and cupric.

18. An infrared and ultraviolet absorbing transparent synthetic organic plastic containing substantially uniformly dispersed therethorugh the reaction product of amino hydroquinone di-alkyl ether and a chloride from the group consisting of ferric and cupric together with a small amount of a strong oxyacid.

19. An infrared and ultraviolet absorbing transparent synthetic organic plastic containing substantially uniformly dispersed therethrough the reaction product of amino hydroquinone di-alkyl ether and a chloride from the group consisting of ferric and cupric in the presence of oxyacid and sodium chloride.

20. An infrared and ultraviolet absorbing transparent synthetic organic plastic containing substantially uniformly dispersed therethrough the ferrous salt of amino hydroquinone di-alkyl ether and further containing a strong oxyacid.

21. An infrared and ultraviolet absorbing transparent synthetic organic plastic containing substantially uniformly dispersed therethrough the reaction product of amino hydroquinone di-alkyl ether and a salt from the group consisting of ferric and cupric, said plastic having a light transmission curve characterized by maximum values in the visible region of the spectrum and which transmission curve sharply decreases in value as the infrared and ultraviolet regions are approached, and in said infrared and ultraviolet regions the transmission of said plastic being relatively low.

22. An infrared and ultraviolet absorbing transparent synthetic organic plastic comprising polyvinyl alcohol containing substantially uniformly dispersed therethrough the reaction product of amino hydroquinone di-alkyl ether and a salt from the group consisting of ferric and cupric, said plastic having relatively high transmission in the visible region of the spectrum and substantially complete cutoff in the infrared and ultraviolet regions of the spectrum.

23. An infrared and ultraviolet absorbing transparent synthetic organic plastic comprising polyvinyl alcohol containing substantially uniformly dispersed therethrough the product of the combination in situ of amino hydroquinone di-alkyl ether and acid with alkali chloride and a chloride from the group consisting of ferric and cupric.

24. An infrared and ultraviolet absorbing transparent synthetic organic plastic containing substantially uniformly dispersed therethrough the product of the combination in situ of amino hydroquinone di-alkyl ether and acid with a chloride from the group consisting of ferric and cupric.

25. An infrared and ultraviolet absorbing transparent synthetic organic plastic containing substantially uniformly dispersed therethrough the product of the combination of amino hydroquinone di-alkyl ether with a chloride from the group consisting of ferric and cupric in the presence of sulphuric acid.

26. An infrared and ultraviolet absorbing transparent synthetic organic plastic comprising polyvinyl alcohol containing substantially uniformly dispersed therethrough the product of the combination of amino hydroquinone di-alkyl ether and a chloride from the group consisting of ferric and cupric in the presence of sulphuric acid and sodium chloride.

27. The method of forming an infrared and ultraviolet absorbing plastic having relative high transmission in the visible region of the spectrum comprising the steps of successively bathing such plastic with baths, one bath comprising a salt from the group consisting of ferric chloride and cupric chloride mixed with a compatible solvent for the plastic being bathed, and a second bath comprising an amino hydroquinone di-alkyl ether mixed with acid and a compatible solvent for the plastic being bathed, the concentrations of ingredients in said baths being controlled in accordance with the duration of the bathings to which the plastic is subjected and transmission values desired for the plactic, the duration of said bathings being sufficient to allow penetration of the plastic by said solvents of the bath to deposit the other ingredients of said baths within the plastic, said other ingredients combining to produce a product imparting to the plastic the desired light transmission characteristics, and said solvents being allowed to evaporate.

28. The method of forming an infrared and ultraviolet absorbing plastic having relative high transmission in the visible region of the spectrum comprising the steps of successively bathing such plastic with baths, one bath comprising a salt from the group consisting of ferric and cupric mixed with a compatible solvent for the plastic being bathed, and a second bath comprising an amino hydroquinone di-alkyl ether mixed with acid and a compatible solvent for the plastic being bathed, the concentrations of ingredients in said baths being controlled in accordance with the duration of the bathings to which the plastic is subjected and transmission values desired for the plastic, and the duration of said bathings being sufficient to allow the solvent of the baths to penetrate the plastic and deposit the other ingredients of said baths within the plastic which combine and impart to the plastic the desired light transmission characteristics, and then heating said plastic at moderate temperatures.

29. The method of forming an infrared and ultraviolet absorbing plastic having relative high transmission in the visible region of the spectrum comprising the steps of successively bathing such plastic with baths, one bath comprising a salt from the group consisting of ferric and cupric mixed with a solvent for the plastic being bathed, and a second bath comprising an amino hydroquinone di-alkyl ether mixed with acid and a solvent for the plastic being bathed, the concentrations of ingredients in said baths being controlled in accordance with the duration of the bathings to which the plastic is subjected and transmission values desired for the plastic, the duration of said bathing being sufficient to allow the solvent of the baths to penetrate the plastic and deposit the other ingredients of said baths within the plastic which impart to the plastic the desired infrared and ultraviolet absorption characteristics desired, and thence dyeing said plastic to the color of plastic desired.

30. In the method of forming an infrared and ultraviolet absorbing plastic having relative high transmission in the visible region of the spectrum, the steps comprising incorporating an amino hydroquinone di-alkyl ether substantially uniformly through said plastic, and then bathing said plastic with a bath comprising a salt from the group consisting of cupric and ferric mixed with a compatible solvent for the plastic being bathed for a time interval sufficient to allow the solvent to penetrate the plastic and deposit the metal salt within the plastic, and allowing said solvent to evaporate.

31. The method of forming an infrared and ultraviolet absorbing plastic having relative high transmission in the visible region of the spectrum comprising the steps of bathing the plastic with a bath comprising a salt from the group consisting of ferric and cupric mixed with a compatible solvent for the plastic being bathed, said plastic having incorporated substantially uniformly therethrough an amino hydroquinone di-alkyl ether which combines with the metal salt to impart the desired transmission characteristics, and drying the plastic to remove the solvent.

32. The method of forming an infrared and ultraviolet absorbing plastic having relatively high transmission in the visible region of the spectrum comprising the steps of first bathing such plastic in a bath comprising an amino hydroquinone di-alkyl ether mixed with acid and a solvent for the plastic being bathed, then bathing the treated plastic in a second bath comprising a salt of the group consisting of ferric and cupric mixed with a solvent for the plastic being bathed, followed by a further bathing of the treated plastic in a bath of substantially the character of the first bath in which the plastic was initially bathed, and subsequently heating the treated plastic at moderate temperatures.

33. The method of treating plastic material to impart thereto a relatively strong absorption character in the near infrared and ultraviolet regions while retaining a relatively high transmission in the visible region of the spectrum comprising the steps of first bathing the plastic material in a bath comprising an amino hydroquinone di-alkyl ether mixed with an acid from the group consisting of nitric and sulphuric acids and a solvent for the plastic material being bathed, then bathing the treated plastic in a second bath comprising a chloride from the group consisting of ferric and cupric mixed with a solvent for the plastic being bathed, followed by a further bathing of the treated plastic in a bath of substantially the character of the first bath in which the plastic was initially bathed, and then heating the plastic at moderate temperatures.

34. The method of treating plastics to impart thereto a relatively strong absorption in the infrared and ultraviolet regions of the spectrum while retaining relatively high transmission in the visible region of the spectrum comprising the steps of first bathing such plastic in a bath comprising an amino hydroquinone di-alkyl ether mixed with a solvent for the plastic, then bathing the treated plastic in a second bath comprising a metal salt from the group consisting of ferric chlorides and cupric chlorides mixed with a solvent for the plastic, followed by a further bathing of the treated plastic in a bath of substantially the character of the first bath in which the plastic was initially bathed, and then heating the plastic at moderate temperatures.

References Cited in the file of this patent

UNITED STATES PATENTS

| | | |
|---|---|---|
| 2,364,112 | Van Every | Dec. 5, 1944 |
| 2,370,244 | Jacobs | Feb. 27, 1945 |
| 2,464,143 | Martinson et al. | Mar. 8, 1949 |
| 2,568,760 | Pearl | Sept. 25, 1951 |